United States Patent [19]
Pisar

[11] 3,970,059
[45] July 20, 1976

[54] ENGINE SPEED CONTROL FOR AN INTERNAL COMBUSTION ENGINE ADAPTED FOR OPERATIONG WITH L.P. GAS

[76] Inventor: Robert J. Pisar, 2807 Spring Creek Road, Rockford, Ill. 61107

[22] Filed: Apr. 30, 1975

[21] Appl. No.: 573,128

[52] U.S. Cl. .............................. 123/103 B; 123/120
[51] Int. Cl.² .................... F02D 11/08; F02M 21/00
[58] Field of Search ............ 123/120, 103 R, 103 B, 123/98

[56] References Cited
UNITED STATES PATENTS

| | | | |
|---|---|---|---|
| 1,547,122 | 7/1925 | Hamilton | 123/120 |
| 2,525,602 | 10/1950 | Jackson | 123/103 B |
| 2,541,419 | 2/1951 | Holloway | 123/120 |
| 2,780,209 | 2/1957 | Renken | 123/120 |
| 2,836,159 | 5/1958 | Morden | 123/103 B |
| 2,935,977 | 5/1960 | Eberline | 123/103 B X |
| 3,443,551 | 5/1969 | Laubach | 123/27 |
| 3,788,289 | 1/1974 | Pfister | 123/103 B |

Primary Examiner—Charles J. Myhre
Assistant Examiner—William C. Anderson
Attorney, Agent, or Firm—Leydig, Voit, Osann, Mayer & Holt, Ltd.

[57] ABSTRACT

An internal combustion engine which is adapted to operate on liquid petroleum gas and including a manually adjustable valve for admitting gas into the combustion chamber to cause the engine to run at a selected speed. A speed responsive governor vane automatically controls the position of a butterfly valve for regulating the flow of combustion air to the chamber and further controls the position of an auxiliary valve for admitting additional gas to the chamber when the engine is under heavy load.

9 Claims, 3 Drawing Figures

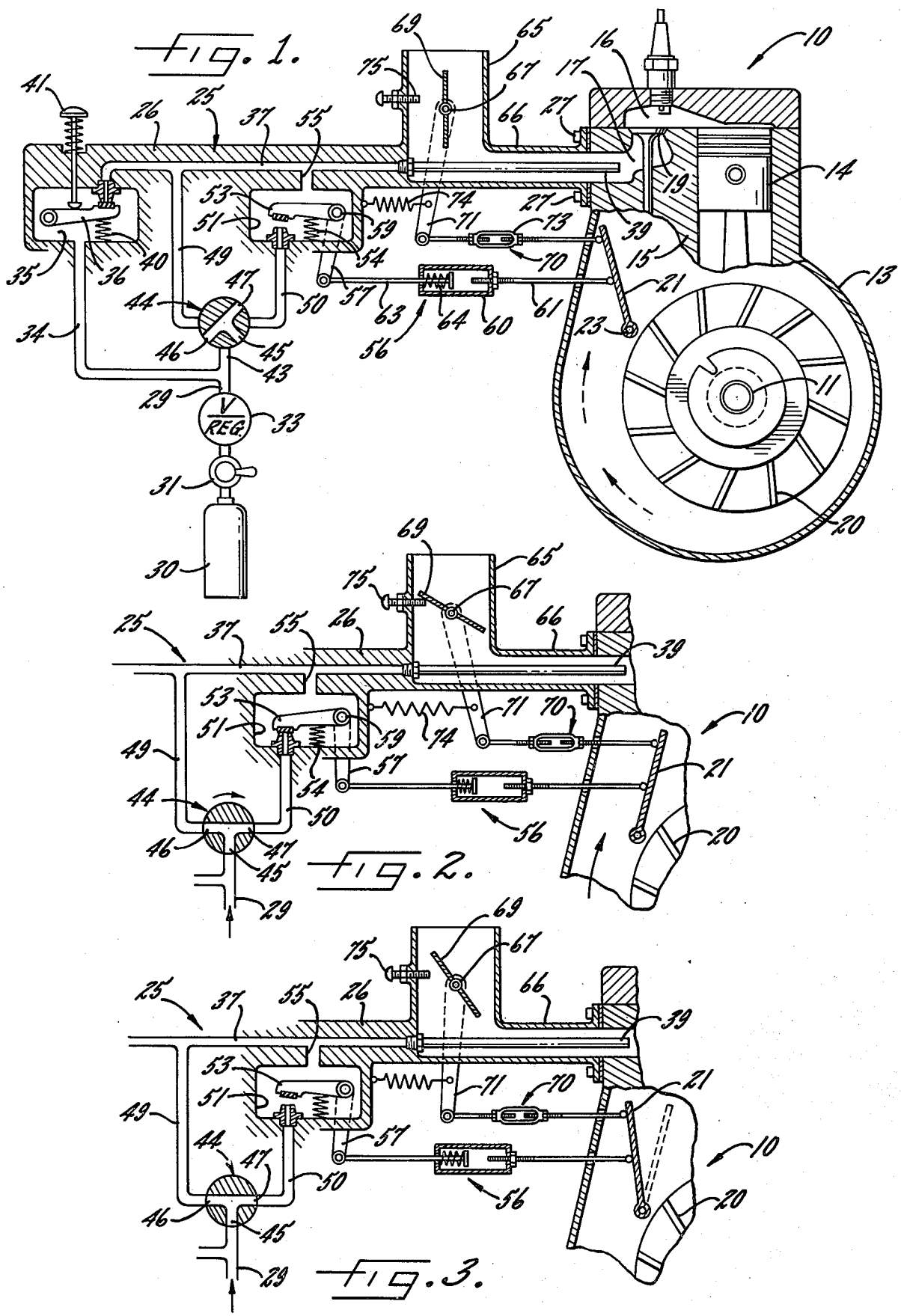

3,970,059

ENGINE SPEED CONTROL FOR AN INTERNAL COMBUSTION ENGINE ADAPTED FOR OPERATION WITH L.P. GAS

BACKGROUND OF THE INVENTION

This invention relates to an internal combustion engine and, more particularly, to an engine in which a governor vane is pivotally mounted in the path of cooling air which is circulated by a fan driven by the output shaft of the engine. As the rotational speed of the shaft increases and decreases because of varying loads, the governor vane swings back and forth and adjusts the flow of a fuel-air mixture to the combustion chamber of the engine in order to keep the shaft turning at a substantially constant speed.

SUMMARY OF THE INVENTION

The general aim of the present invention is to provide a new and improved internal combustion engine of the above character which is uniquely adapted to operate on liquid petroleum gas, the governor vane of the engine being used in a novel manner to maintain the fuel-air ratio at an optimum value at all times during operation of the engine.

A further object is to provide a liquid petroleum gas engine of the foregoing type which is easy to start, is efficient in operation, possesses a long service life, requires little maintenance and produces hardly any atmospheric pollution.

A more detailed object is to provide a liquid petroleum gas engine in which the governor vane uniquely controls an auxiliary fuel valve for admitting extra fuel to the combustion chamber when the engine is under heavy load, the vane also controlling the position of a butterfly valve for regulating the flow of air to the combustion chamber.

The invention also resides in the novel arrangement of the auxiliary fuel valve, a main speed selector valve and a starting valve, and further is characterized by the provision of unique linkage means between the governor vane and the auxiliary fuel valve and butterfly valve.

These and other objects and advantages of the invention will become apparent from the following detailed description when taken in conjunction with the accompanying drawings.

BRIEF DESCRIPTION OF THE DRAWINGS

FIG. 1 is a view which schematically illustrates a new and improved internal combustion engine incorporating the novel features of the present invention, the engine being shown in a pre-starting condition.

FIG. 2 is a view similar to FIG. 1 but shows the engine in a normal running condition.

FIG. 3 is also a view similar to FIG. 1 but shows the engine under a heavy load condition.

DETAILED DESCRIPTION OF THE PREFERRED EMBODIMENT

As shown in the drawings for purposes of illustration, the invention is embodied in an internal combustion engine 10 which preferably is of the single cylinder - four cycle type commonly used on lawn mowers. The engine includes a crankshaft 11 journaled in a housing 13 and adapted to be rotated in a clockwise direction as a piston 14 reciprocates upwardly and downwardly in a cylinder block 15 in response to the ignition of a fuel-air mixture in a combustion chamber 16. The mixture is introduced into the combustion chamber through an intake passage 17 in the block and its admission into the chamber is controlled by a conventional intake valve 19.

Mounted on and rotatable with the crankshaft 11 is a centrifugal fan 20 which circulates air past the cylinder block 15 in order to cool the latter. A governor vane 21 is pivotally mounted within the housing 13 at 23 and is disposed in the path of the circulating air so as to swing in a clockwise direction as the speed of the fan increases and to swing reversely when the fan decreases in speed.

In its primary aspect, the present invention contemplates operating the engine 10 on liquid petroleum gas and controlling the admission of fuel and air to the combustion chamber 16 in a novel manner insuring that the engine will start easily, run smoothly, require low maintenance, possess high efficiency and produce low exhaust emissions. To carry out the invention, provision is made of a unique control 25 which coacts with the governor vane 21 and which causes a proper amount of air and liquid petroleum gas to be delivered into the combustion chamber to promote optimum operation of the engine at all speeds.

More specifically, the components of the fuel-air control 25 of the present invention are associated with a casting 26 (shown schematically in the drawings) which is bolted to the cylinder block 15 at 27. Liquid petroleum gas such as propane or butane is supplied to an inlet passage 29 in the casting from a standard cylinder 30 by way of an on-off valve 31 and an adjustable pressure regulator 33. The initially liquid fuel vaporizes to a heavy gaseous state upon being exposed to atmospheric pressure and temperature in the passage 29, and part of the gas flows through a passage 34 to a chamber 35 which houses a starting valve 36. When the valve 36 is open, gas flows out of the chamber 35 through an outlet passage 37 which connects to an injection tube 39 leading into the intake passage 17 in the cylinder block 15. The starting valve 36 is normally urged to a closed position by a spring 40 in the chamber 35 and is adapted to be opened when a spring-loaded plunger 41 is manually depressed.

Gas in the passage 29 also flows into a passage 43 to a main fuel valve 44, which is adapted to be manually turned from a closed position to various open positions to regulate the amount of gas delivered to the engine 10 during normal operation. Herein, the main valve 44 includes a rotatable body with an inlet passage 45 and two outlet passages 46 and 47. When closed as shown in FIG. 1, the valve 44 blocks off the passage 43 and thus fuel from the cylinder 30 can flow only to the chamber 35. When the valve 44 is opened by being turned in a clockwise direction to the position shown in FIG. 2, the inlet passage 45 moves into alinement with the passage 43, the outlet passage 46 moves into alinement with a passage 49 leading to the main outlet 37, and the outlet passage 47 moves into alinement with a passage 50 leading to a chamber 51. Positioning of the valve between the positions shown in FIGS. 1 and 2 brings the passages 45, 46 and 47 into partial alinement with the passages 29, 49 and 50, respectively, and causes a lesser flow of gas to the passages 49 and 50.

The chamber 51 houses an auxiliary gas valve 53 which is urged to pivot to an open position by a spring 54, and which, when open, allows gas to flow from the chamber to the main outlet 37 through a passage 55. In keeping with the invention, the position of the auxiliary gas valve 53 is controlled by the position of the governor vane 21 and thus is regulated in accordance with the speed of the shaft 11. For this purpose, a linkage 56 is pivotally connected at one end to the vane 21 and is pivotally connected at its other end to an arm 57 which is rigid with the rockshaft 59 of the valve 51. Clockwise swinging of the vane 21 from the position shown in FIG. 1 to that shown in FIG. 2 causes the linkage 56 to close the auxiliary valve 53 while counterclockwise swinging of the vane enables the spring 54 to open the auxiliary valve. A lost-motion connection preferably is incorporated in the linkage 56 and comprises a sleeve 60 which threadably receives one link 61 of the linkage and slidably receives the other link 63 of the linkage, there being a spring 64 housed within the sleeve and allowing some left-to-right motion of the sleeve before imparting corresponding movement to the valve 53. Initial adjustment of the position of the valve 53 with respect to the position of the vane 21 may be effected by lengthening or shortening the linkage 56 by adjusting the sleeve 60 along the threaded link 61.

To complete the control 25, a tubular air intake 65 is formed as an integral part of the casting 26 and includes a delivery pipe 66 surrounding the gas injection tube 39 and leading to the intake passage 17 of the cylinder block 15. A rockshaft 67 mounts a butterfly valve 69 within the air intake 65 to swing from a fully open position (FIG. 1) toward a closed position (FIG. 2) and thereby regulate the flow of combustion air to the chamber 16.

The position of the butterfly valve 69 also is controlled by the position of the governor vane 21. To this end, a linkage 70 is pivotally connected at one end to the vane and at its other end to an arm 71 which is rigid with the rockshaft 67, there being a turnbuckle 73 or the like incorporated in the linkage to enable its length to be initially adjusted. Clockwise swinging of the vane 21 causes the linkage 70 to move the butterfly valve 69 in the closing direction while reverse swinging of the vane enables the butterfly valve to be opened by a spring 74 which is stretched between the casting 26 and the arm 71. The spring 74 also acts through the linkage 70 to return the vane 21 in a counter-clockwise direction when the shaft 11 slows and the air flow from the fan 20 decreases. To prevent the butterfly valve from completely closing off the air intake 65, a manually adjustable stop screw 75 is threaded into the air intake and limits closing movement of the butterfly valve beyond a position determined by the adjusted position of the screw.

FIG. 1 shows the positions which the various parts occupy prior to starting of the engine 10. Such starting is effected by turning the shaft 11 with a suitable starter rope (not shown) while the speed selector valve 44 is closed and while the starting valve 41 is manually depressed to an open position. The manually controlled starting valve 41 enables the intake passage 17 and combustion chamber 16 to be charged with an adequate amount of gas while reducing the risk of choking the engine with an oversupply of gas. Starting of the engine is facilitated and backfiring during starting is avoided if the injection tube 39 projects well into the intake passage 17 as shown in FIG. 1 rather than terminating flush with the outer side of the cylinder block 15.

As soon as the engine 10 has fired, the starting valve 41 is released and the main valve 44 is manually adjusted to set the gas flow for establishing the desired no-load running speed. As the speed of the shaft 11 increases, the air from the fan 20 swings the vane 21 in a clockwise direction (see FIG. 2) to cause the linkages 56 and 70 to close the auxiliary valve 53 and to move the butterfly valve 69 in the closing direction. After the auxiliary valve 53 closes, gas is admitted into the combustion chamber 16 only by way of the passage 49 as long as the engine keeps running at the selected speed. The vane 21 keeps the butterfly valve 69 in a partially closed position and causes the proper amount of air to mix with the gas being delivered through the passage 49.

If the shaft 11 encounters a heavy load, the reduced flow of air from the fan 20 causes the governor vane 21 to pivot in a counter-clockwise direction (see FIG. 3). As a result, the linkage 56 causes the auxiliary valve 53 to open and admit an additional flow of gas to the combustion chamber 16 through the passage 55. At the same time, the linkage 70 causes the butterfly valve 69 to open and admit additional air to the chamber 16 to support efficient combustion of the gas. The additional fuel-air mixture introduced into the combustion chamber results in the engine developing greater power so as to bring the speed back up to substantially its selected value. When the heavy load disappears and the engine tends to overspeed, the auxiliary valve 53 and the butterfly valve 69 are returned in their closing directions by the action of the vane 21 and thus the speed of the engine is reduced to the setting established by the main valve 44.

From the foregoing, it will be apparent that the present invention brings to the art a new and improved engine 10 which is adapted to operate efficiently on liquid petroleum gas such as propane or butane. The control 25 leaves the butterfly valve 69 open during starting of the engine and thus enables a large flow of air to the chamber 16 to support rapid combustion of the gas admitted through the starting valve 36. As the engine gains speed and the temperature of the chamber 16 increases, less air is needed for efficient combustion of the gas and hence the butterfly valve 69 is moved in a closing direction. Under heavy loads, both the butterfly valve and the auxiliary fuel valve 53 are opened to provide additional mixture enabling the engine to develop greater power and substantially maintain the selected speed.

The liquid petroleum gas burns cleanly in the engine 10 and thus only infrequent oil changes and spark plug replacements are necessary. Accordingly, the engine requires little maintenance and is capable of an extremely long service life since fewer carbon deposits build up in the engine. Also, noxious exhaust fumes are low as compared to those produced by gasoline-powered engines.

I claim:

1. An internal combustion engine having a combustion chamber, a shaft adapted to be rotated as an incident to combustion of a fuel-air mixture in said chamber, and a fan connected to said shaft and operating in accordance with the rotational speed of the shaft, said engine further including a vane mounted for pivotal movement in the path of the air circulated by said fan and adapted to swing in first and second directions as the speed of said fan respectively decreases and increases, the improvement in said engine comprising, a source of liquid petroleum gas connected to communicate with said combustion chamber, first valve means between said source and said chamber and manually adjustable to regulate the flow of gas to said chamber, second valve means between said source and said chamber and adapted, when opened, to increase the flow of gas to said chamber, an air intake communicating with said chamber, a butterfly valve mounted in said air intake for movement between open and closed positions to increase and decrease, respectively, the flow of air to said chamber, first linkage means connected between said vane and said butterfly valve for effecting movement of the latter toward said open and closed positions as said vane swings in said first and second directions, respectively, and second linkage means connected between said vane and said second valve means for effecting opening and closing of said second valve means as said vane respectively swings in said first and second directions.

2. An internal combustion engine as defined in claim 1 further including a normally closed and manually operable starting valve connected between said source and said chamber.

3. An internal combustion engine as defined in claim 2 further including means for urging said starting valve to a closed position.

4. An internal combustion engine as defined in claim 1 in which said first valve means includes first passage means for establishing communication between said source and said chamber and further includes second passage means for establishing communication between said source and said second valve means independently of said first passage means, said second passage means moving to a position to admit more fuel to said second valve means when said first valve means is adjusted to cause said first passage means to admit more fuel to said chamber.

5. An internal combustion engine as defined in claim 1 further including biasing means for urging said butterfly valve toward said open position, said first linkage means moving said butterfly valve toward said closed position against the action of said biasing means when said vane swings in said second direction, and means for stopping said butterfly valve to prevent the latter from completely closing off said air intake.

6. An internal combustion engine as defined in claim 5 in which said last-mentioned means are selectively adjustable to enable adjustment of the stopped position of said butterfly valve.

7. An internal combustion engine as defined in claim 5 in which said biasing means urge said vane to swing in said first direction.

8. An internal combustion engine as defined in claim 5 in which said first linkage means is selectively adjustable to enable adjustment of the position of said butterfly valve when said vane is in a given position.

9. An internal combustion engine as defined in claim 1 further including a biasing means for urging said second valve means open, said second linkage means closing said second valve means against the action of said biasing means when said vane swings in said second direction.

* * * * *